United States Patent

Probst et al.

[15] 3,693,984

[45] Sept. 26, 1972

[54] MINIATURE TAPE RECORDER

[72] Inventors: Georg Probst, Munich; Walter Herterich, Dachau, near Munich, both of Germany

[73] Assignee: Compur-werk Gesellschaft mit beschrankter Haftung & Co., Munich, Germany

[22] Filed: Aug. 26, 1969

[21] Appl. No.: 853,115

[30] Foreign Application Priority Data

Aug. 26, 1968 Germany..........P 17 97 181.2

[52] U.S. Cl...............274/4 C, 274/4 D, 179/100.2 Z

[51] Int. Cl...........................................G11b 15/24

[58] Field of Search..............................242/200–202; 274/4 D, 4 C, 11 D, 11 C; 179/100.2, 100.2 Z

[56] References Cited

UNITED STATES PATENTS

| | | | |
|---|---|---|---|
| 3,008,012 | 11/1961 | Proctor | 274/4 D |
| 2,819,350 | 1/1958 | Steinegger | 242/201 X |
| 3,016,244 | 1/1962 | Schuh | 274/4 |
| 3,310,638 | 3/1967 | Burton | 274/4 X |
| 3,352,169 | 11/1967 | Delin | 179/100.2 Z X |
| 3,383,473 | 5/1968 | Schroter | 179/100.2 Z |
| 3,401,397 | 9/1968 | Blakistone | 179/100.2 Z X |
| 3,488,058 | 1/1970 | Staar | 274/4 E |

OTHER PUBLICATIONS

Begun, S.I. Magnetic Recording N.Y., Murry Hill Books Inc., 1949. p. 107. TK 5981 B33. C2.

*Primary Examiner*—Leonard Forman
*Assistant Examiner*—Dennis A. Dearing
*Attorney*—Ward, McElhannon, Brooks and Fitzpatrick

[57] ABSTRACT

Miniature tape recorder having a recording and play back head and combined microphone-loud-speaker arranged with their axes substantially co-axial with the projected axis of the drive motor to afford size and noise level reduction.

6 Claims, 10 Drawing Figures

MINIATURE TAPE RECORDER

The present invention relates to a miniature tape recorder for the electromagnetic recording, storage and playback of information consisting of a battery-fed drive motor, a tape cassette adapted to be inserted in the ap-paratus, a combined recording-playback head, an erasure head, an electronic amplifier, switch means and a combined microphone loudspeaker.

In the field of miniature tape recorders, efforts during the last few years have been directed more and more towards the development of even smaller and handier pocket dictation instruments. In this connection it has been found, however, that the playback quality becomes poorer as the dimensions of the tape recorder become smaller, since the disturbing influences effected by coupling become greater and greater and there is no room available for corresponding decoupling elements. Thus, for instance, in the miniature tape recorders developed up to the present time having the size approximately of a pack of cigarettes, a noise level of only about 20 – 25 db is obtained, resulting in a noticeable reduction in the playback quality of such miniature tape recorders.

The object of the present invention is to avoid this disadvantage and, by a substantial improvement in the noise level, make it possible to construct even smaller miniature tape recorders.

In accordance with the invention this result is obtained in the manner that the combined recording and play-back head as well as the combined microphone-loudspeaker have their axes arranged substantially as an extension of the axis of the drive motor.

On basis of this arrangement there is obtained optimum decoupling of both electromagnetic and mechanical disturbing influences, since on the one hand the disturbing magnetic fields produced by the drive motor are relatively slight in the vicinity of the extension of the longitudinal axis of the drive motor, while on the other hand the mechanical oscillations produced by the imbalance of the drive motor extend only perpendicular to the axis of sensitivity of the microphone-loudspeaker and thus can only insignificantly influence the latter.

On basis of experiments it has been found that, in contradistinction to the previously known miniature tape recorders having a noise level of about 20 – 25 db, it is possible on basis of the arrangement of the invention to obtain a noise level of the order of magnitude of 40 db. Such a noise level thus corresponds essentially to the noise level of substantially larger tape recorders, for instance ones of portable type.

An advantageous embodiment of the invention is characterized by the fact that the miniature tape recorder is developed in the shape of a bar and that the drive motor is arranged in the vicinity of the one end, the combined microphone-loudspeaker at the other end and the recording-playback heads, including the insertable tape cassette, in the region of the center of the bar-shaped recorder. By this arrangement there is obtained a further improvement in the noise level, since interacting elements are arranged as far as possible from each other.

One very suitable development of the invention is obtained by providing a drive-wheel mount which is displaceable in the longitudinal direction of the recorder and on which two drive wheels connected to each other by a drive belt are arranged, the drive wheel which faces the drive motor being provided with a drive pinion having its outer surface in the region of engagement of the driveshaft stub of the drive motor and having its drive pinion which extends through an opening in the wall of the cassette located in the region of engagement of the one drive wheel while the surface of the other drive wheel is located in the region of engagement of the other drive wheel, and by arranging the drive-wheel mount parallel to a sliding switch provided with an operating knob, and that these two parallel elements are connected with each other by a hairpin spring with bent legs.

A further improvement in the noise level during playback is obtained in the manner that the recording-playback and erasure heads are arranged, while maintaining the greatest possible spacing, on the end side of the tape cassette located away from the drive motor, transverse to the longitudinal axis of the recorder.

In miniature tape recorders, difficulties have always been encountered with respect to the installation of an actuating mechanism for brining the drive wheels against the tape spools in the different operating positions of the tape recorder. By the arrangement described above with the use of a slider which acts with spring pressure on a drive-wheel mount there is obtained an extremely simple actuating mechanism of this type.

Finally, it has been found very advisable if the slider has a keyhole bore through which there can be inserted only in the central position of the operating knob the base, provided with an annular groove, of a bolt which actuates a set of changeover contacts and is supported displaceably under spring action, and if, as a result of the spatial development of the keyhole bore after actuating of the bolt, the operating knob can be displaced only into one of the two possible outer positions, thereby effecting a locking of the axially displaceable bolt. On basis of this arrangement there is obtained an extremely dependable interlock system for the recording position.

Further aspects of the invention will be explained in greater detail below on basis of an embodiment indicated by way of example, reference being had to the accompanying drawings in which.

Figure 1:
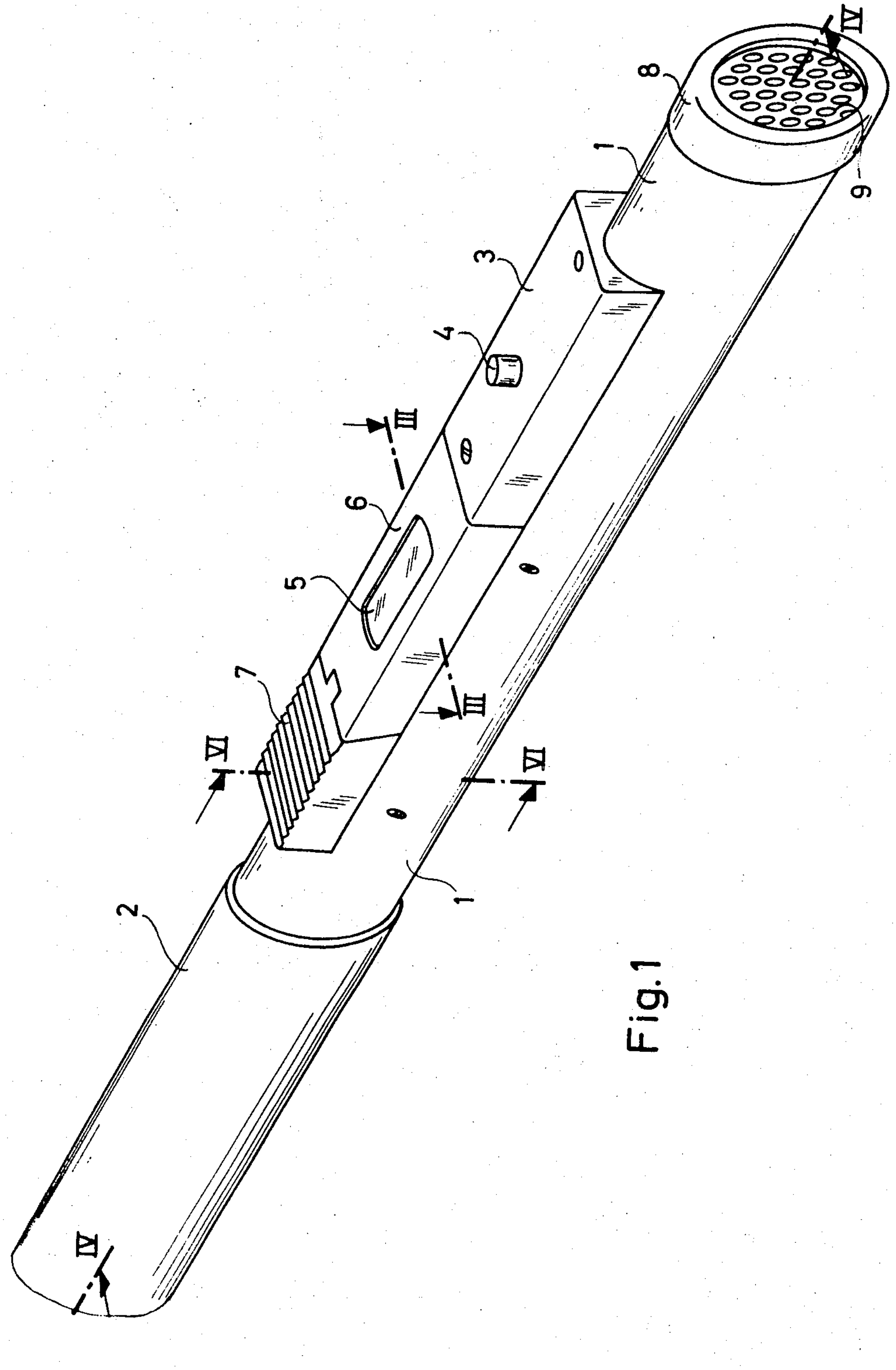
FIG. 1 is a perspective view of the miniature tape recorder in accordance with the invention.

As can be noted from FIG. 1, the miniature tape recorder of the invention has a tubular main housing 1 on one end of which there is placed a tubular battery housing 2 which is fastened in suitable manner. In the central region of the miniature tape recorder there is provided an electronic housing 3 of approximately parallel piped shape through which housing a recording button 4 extends. Alongside the electronic housing 3, a tape cassette 6 provided with a tape viewing opening 5 can be inserted into the miniature tape recorder, a slide lock 7 being arranged alongside of it in order to lock the tape cassette 6 in its operating position. On the end of the miniature tape recorder opposite the battery housing 2 there is provided a holding ring 8 having a perforated plate 9 behind which — as will be described hereinbelow — the combined microphone-loudspeaker is arranged.

Figure 2:
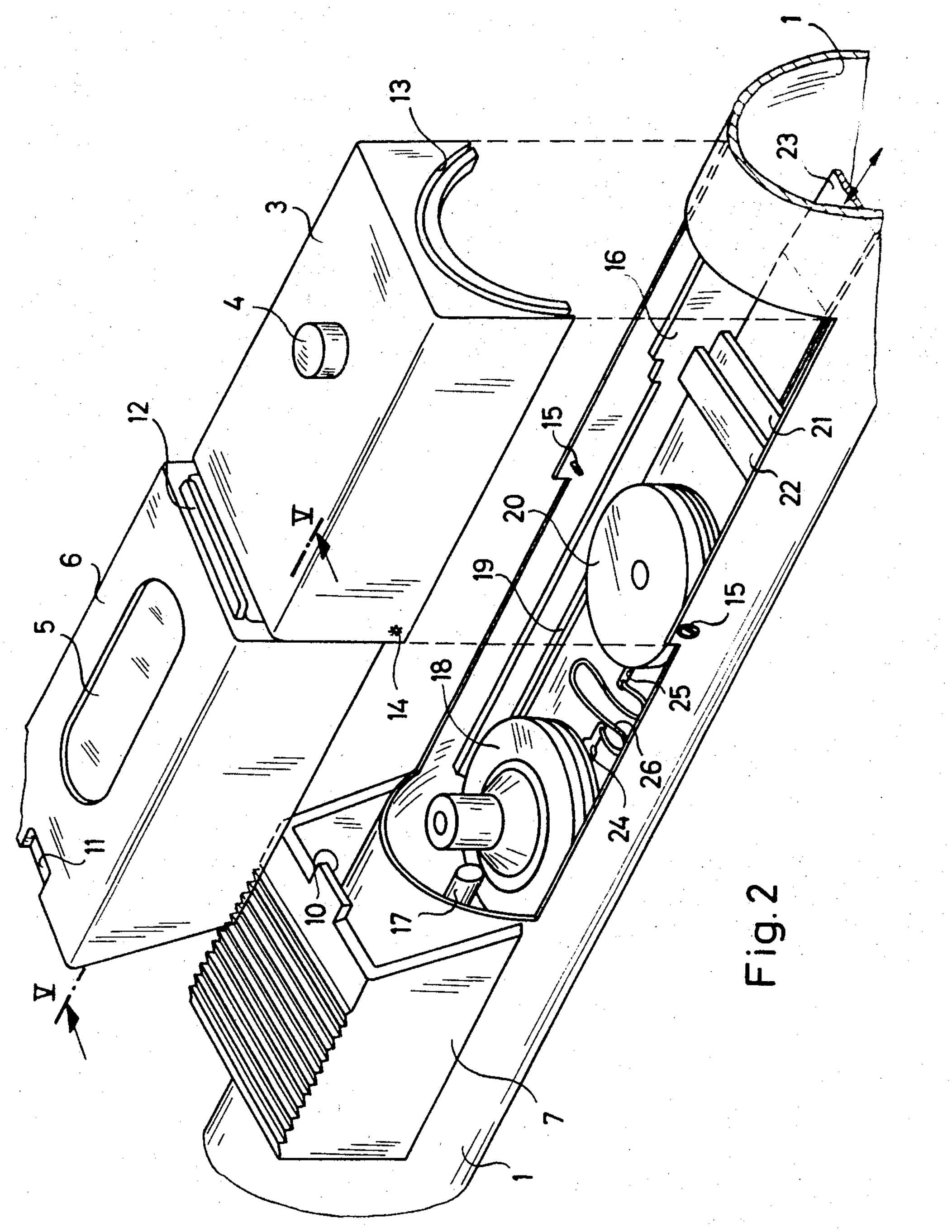
FIG. 2 is a perspective view on a larger scale of the central portion of the miniature tape recorder of FIG. 1 with the tape cassette removed and the electronic housing disconnected.

FIG. 2 shows a partial view on a larger scale of the central region of the miniature tape recorder of the invention with the electronic housing 3 lifted off and the tape cassette 6 removed. As can be noted on basis of this figure, the slide lock 7 has a protruding extension 10 which, when the tape cassette 6 is inserted and the slide lock 7 advanced, comes to rest in a corresponding recess 11 in the tape cassette 5. The tape cassette 6 on the side opposite the recess 11 has a protruding edge 12 which, when the tape cassette 6 is inserted, lies below the upper edge of the electronic housing 3, resulting in a locking of the tape cassette 6 on both sides. The electronic housing 3 in its turn is provided with a grove 13 having the shape of a ring segment which surrounds the upper part of the edge of the wall of the main housing 1. The attachment of the electronic housing 3 to the main housing 1 is effected furthermore by means of two screws 15 which are threaded into corresponding threaded holes 14 of the electronic housing 3.

The movable part of the miniature tape recorder are supported on the small tubular shuttle 16 which is fastened in suitable manner within the housing 1.

The miniature tape recorder of the invention is driven from a drive motor, not shown in FIG. 2, the driveshaft stub 17 of which acts on the rubber covering of a first drive wheel 18 which, via a drive belt 19, drives a second drive wheel 20. The two drive wheels 18, 20 are supported on a drive-wheel mount 21 which is displaceable in the longitudinal direction of the miniature tape recorder. Below the drive-wheel mount 21 which is guided by means of a holding lug 22 there is provided a slider 23 which is also displaceable in the longitudinal direction of the miniature tape recorder and is in engagement with a hairpin spring 26 with bent legs which extends through slots 24, 25 in the drive-wheel mount 21. The manner of operation of this slider 23 will be described further below.

Figure 3:
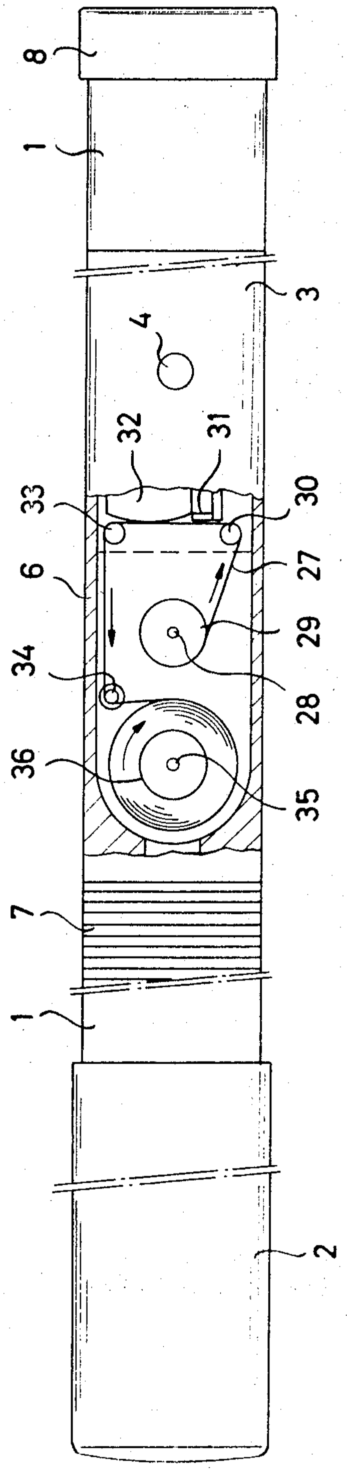
FIG. 3 is a top view — partially in section — of the miniature tape recorder shown in FIG. 1.

FIG. 3 shows a top view — partially in section — of the miniature tape recorder shown in FIG. 1. There can be noted the main housing 1 of the miniature tape recorder with the battery housing 2, the sliding lock 7, the electronic housing 3 with the recording head 32, as well as the holding ring 8 for the combined microphone-loudspeaker. From the cross-sectional view through the tape cassette 6 there can furthermore be noted the guide system for the magnetic tape 27 which, during forward travel, advances from a supply spool 29 supported on a pin 28 via a guide pin 30 to an erasure head 31 and a combined recording and playback head 32 and from there via two additional guide pins 33, 34 to a take-up spool 36 which is supported on a shaft 35. In this connection there is provided within the tape cassette 6 a spring element (not shown) which presses the tape 27 against the combined recording and playback head 32.

Figure 4:
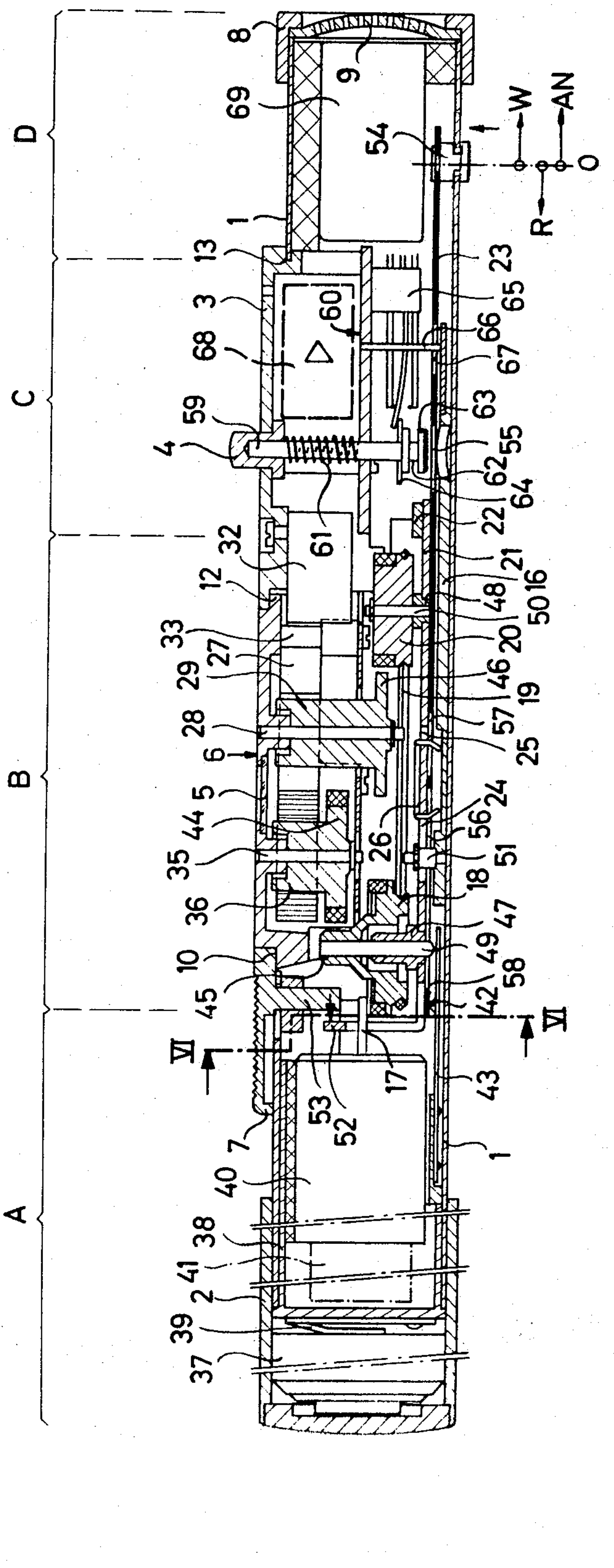
FIG. 4 is a longitudinal section along the line IV—IV of FIG. 1.

FIG. 4 shows a longitudinal section through the miniature tape recorder shown in FIG. 1. In this figure one can note the main housing 1 with the battery housing 2, the electronic housing 3 and the tape cassette 6 in which, in accordance with the explanation given in FIG. 3, a magnetic tape 27 is contained which is conducted between a supply spool 29, guide pins and a take-up spool 36. In the lower region of the tape recorder of the invention there can furthermore be noted the drive wheels 18 and 20 which are supported on the displaceable drive-wheel mount 21 and connected with each other by a drive belt 19, as well as the slider.

As can be noted from FIG. 4, the miniature tape recorder of the invention consists essentially of four subassemblies, namely a drive part "A", a tape part "B" with cassette and drive-wheel drive, an electronic part "C" and a microphone-loudspeaker part "D". These individual subassemblies will be explained one after the other below.

The drive part "A" comprises essentially the cup-shaped battery housing 2 in which there are inserted a number of disc-shaped batteries 37. The battery housing 2 itself is placed over a motor housing 38 which at its end surface has a contact spring 39 in order to obtain good contact with the batteries 37. Within the battery housing 38 there is arranged a drive motor 40 which is provided with a centrifugal governor 41 of the conventional structure on the side thereof opposite the driveshaft stub 17. Below the drive motor 40, a leaf spring 43 having a stud 42 is fastened to the motor housing 38, the purpose of which spring will be explained below.

Figure 5:
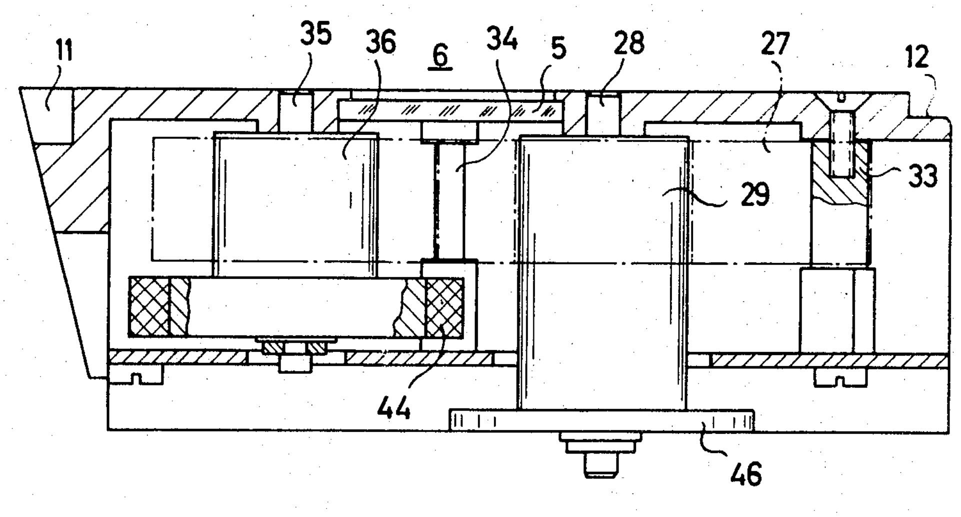
FIG. 5 is a section on a larger scale through the tape cassette shown in FIG. 4.

In the central region of the miniature tape recorder of the invention there is arranged the tape part "B" shown in FIG. 4 with the tape cassette 6 which is shown on a larger scale in FIG. 5. As can be noted from FIGS. 4 and 5, in the lower region of the tape cassette 6 there is provided a tape transporting wheel 44 which is arranged on the shaft 35 of the take-up spool 36, the said drive wheel 44 extending, as shown in FIG. 4, through an opening in the tape cassette 6 into the region of engagement with a drive pinion 45 of the first drive wheel 18. In the lower region of the supply spool 29 which is arranged on the pin 28 there is also provided a tape transporting wheel 46 which extends through the housing of the tape cassette 6 and — as shown in FIG. 4 — is arranged in the region of engagement of the second drive wheel 20.

As shown in FIG. 4, in the lower region of the tape part "B", there is arranged the drive-wheel mount 21 to which the pins 49, 50 are rigidly fastened by means of bushings 47, 48. The drive wheels 18, 20 which are provided with rubber surfacings vulcanized thereon are then placed for rotation on said pins 49, 50, said drive wheels being connected with each other — as already mentioned — by means of the drive belt 19. The guiding of the drive-wheel mount is effected by means of the aforementioned holding lug 22, a guide pin 51 being furthermore provided. On its left-hand side the drive-wheel mount 21 has an angle extension 52 which is in the region of engagement of a driving finger 53 of the slide lock 7 of the tape cassette 6. The precise purpose of this arrangement will be described further below.

Below the drive-wheel mount 21 there is arranged the slider 23 which, in the region of the microphone-loudspeaker part "D", has an operating knob 54 which extends through a slot in the main housing 1. In the region of the electronic part "C", the slider 23 has a keyhole bore 55 which is arranged coaxially to the recording button 4 and the tapered end of which lies on the side facing away from the operating knob 54. The purpose of this keyhole bore 55 will be described further below. As can furthermore be noted from FIG. 4, the two ends of the bent-leg hairpin spring 26 extend through the slots 24, 25 in the drive-wheel mount 21 and through corresponding holes 56, 57 in the slider 23,, the arrangement being such that the slider 23 comes against the ends of the hairpin spring 26 only after traveling over a certain path and thus only at such time produces a mechanical coupling with the displaceable drive-wheel mount 21. In the region of the stud 42 provided on the leaf spring 43 there is provided an intermediate arm 58 which is arranged between two holes in the slider 23, the purpose of which will also be described below.

In the region of the electronic part "C" shown in FIG. 4 there is provided the recording button 4 which extends through the main housing 1 and is supported on a pin 59. Between the recording button 4 and a printed circuit board 60 arranged in the electronic part "C" there is provided a spring 61 which urges the recording button 4 into its upward position. The pin 59 is extended through the printed circuit board 60 and has a foot 63 which is provided with an annular groove 62 and above which a washer 64 consisting of a suitable insulating material is arranged. In the region of engagement of the washer 64 there is provided a set of changeover contacts 65 consisting of two or more switches by which switching from "playback" to "record" is effected. In the region of the set of changeover contact 65 there is provided a circuit-closing contact pin 66 which is supported in insulated fashion and extends through a hole 67 within the grounded slider. Above the printed circuit board 60 there is finally arranged the electronic system of the miniature tape recorder consisting essentially of an amplifier 68.

The microphone-loudspeaker part "D" shown in FIG. 4 contains — aside from the operating button 54 — a combined microphone-loudspeaker 68 the axis of sensitivity of which in accordance with the invention lies along the extension of the drive shaft of the drive motor 40.

Figure 6:
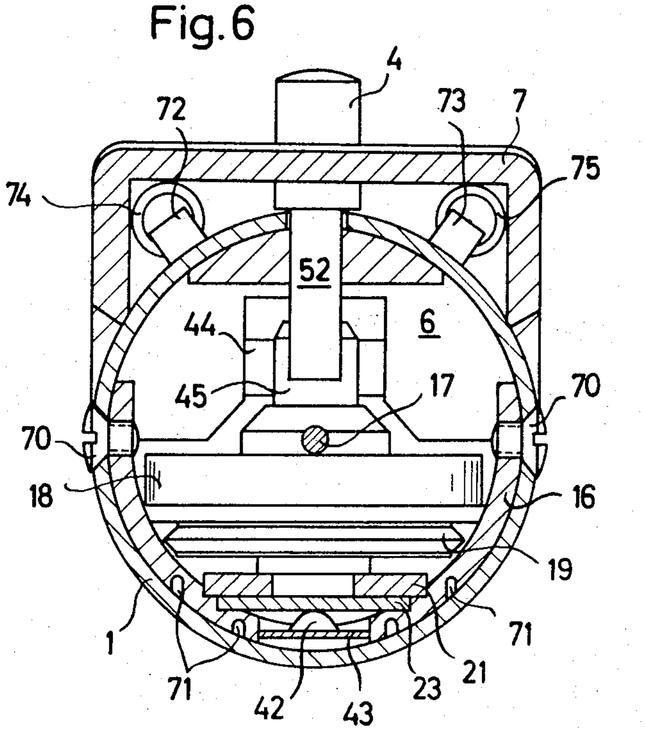
FIG. 6 is a cross-sectional view along the line VI—VI of FIG. 1.

FIG. 6 is a cross-section through the miniature tape recorder in accordance with the invention. One can note the main housing 1 in which the shuttle 16 is fastened by means of fillister-head screws 70. In the outer wall of the shuttle 16 there are arranged a plurality of longitudinal grooves 71 through which the electric wiring of the miniature tape recorder of the invention is conducted. Within the shuttle 16 there lie, seen from the bottom to the top, first of all the lead spring 43 provided with the stud 42, the slider 23 and the drive-wheel mount 21 with the drive wheels 18, 20 placed thereon, of which drive wheels, to be sure, only the drive wheel 18 which is in engagement with the driveshaft stub 17 of the drive motor 40 and the drive belt 19 can be noted. In the upper region of the drive wheel 18 there can be noted the drive pinion 45 which, through a corresponding recess within the tape cassette 6, is in engagement with the tape transporting wheel 44. In the showing of FIG. 6, the drive pinion 45 is covered in part by the driving projection 53 fastened to the slide lock 7. Outside the main housing 1 there are arranged two lugs 72, 73 against which two compression springs 74, 75 inserted within the driver 7 act. By this arrangement, the slide lock 7 is pressed into the locked position of the tape cassette 6.

The manner of operation of the miniature tape recorder of the invention will be described below with special reference to FIGS. 7 to 10.

In order to place the miniature tape recorder of the invention in operation, batteries 37 must be inserted in the battery housing 2, which can be effected by very simply removing the battery housing from the motor housing 38 and then pushing it on again. Furthermore, a tape cassette 6 must be inserted, which can be effected by pushing the slide lock 7 back against the force of the compression spring 74 shown in FIG. 6 and then pushing the tape cassette 6 obliquely downwards, in which connection the protruding edge 12 shown in FIG. 2 is first of all pushed below the electronic housing 3, the tape cassette is then swung around this point of insertion, and the extension 10 is caused to engage in the recess 11. The right-angle extension 52 provided on the drive-wheel mount 21 serves to bring the drive-wheel mount 21 into its rest position upon the pushing back of the slide lock 7 — i.e., shortly before the removal or insertion of a tape cassette 6 — should the drive-wheel mount be either in playback or recording position as a result of an actuation of the operating knob 54. In this way the relatively sensitive rubber covering of the tape transporting wheel 44 is protected from damage by the drive pinion 45 upon insertion of the tape cassette 6 into the miniature tape recorder.

Figure 7:
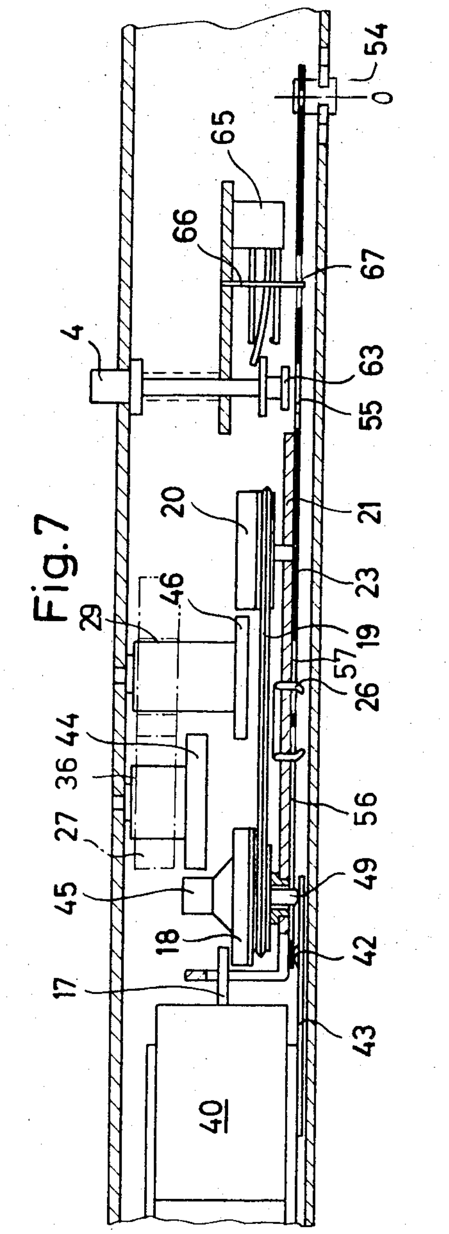
FIGS. 7 to 10 are views on a larger scale of the central portion of the sectional view shown in FIG. 4 serving to explain the manner of operation of the miniature tape recorder of the invention, shown in positions of rest, rewind, recording and playback.

FIGS. 4 and 7 shows the moving parts of the miniature tape recorder of the invention at rest, this corresponding to the central or "O" position of the operating knob 54. The ends of the bent-leg hairpin spring 26 are free within the holes 56, 57 of the slider 23, so that no lateral pressure is exerted on the drive-wheel mount 21. Accordingly the tape transporting wheel 44 is not in engagement with the drive pinion 45 of the first drive wheel 18 and the transporting wheel 46 is not in engagement with the drive wheel 20. Furthermore, the intermediate arm 58 arranged on the slider 23 presses against the stud 42 provided on the leaf spring 43, whereby the leaf spring 43 is pressed downwards. The end of the lead spring 43 therefore does not exert any pressure on the shaft 49 of the first drive wheel 18, so that the latter is also free with respect to the driveshaft stub 17 of the drive motor 40.

Figure 8:
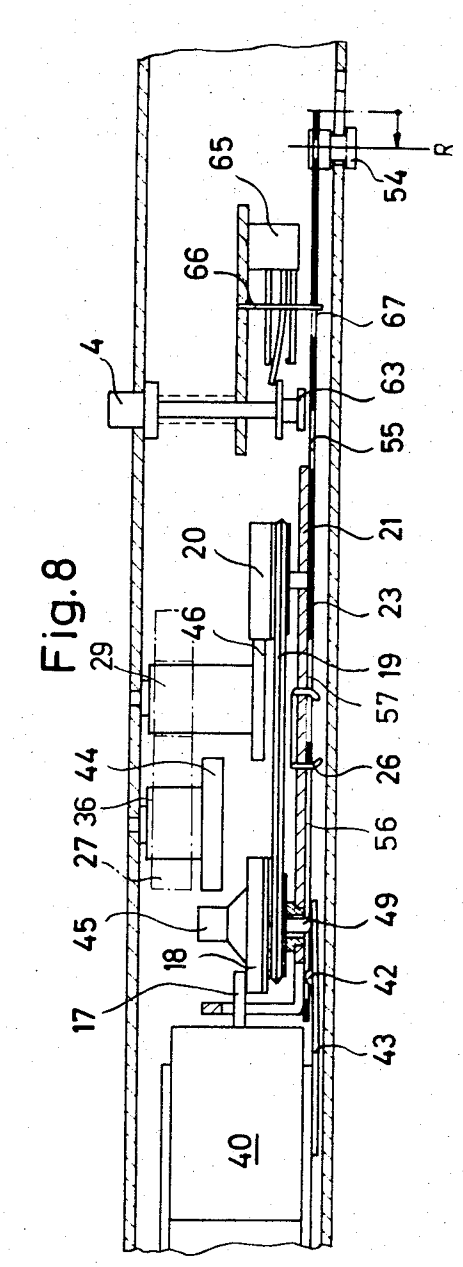

By moving the operating knob 54 to the left, the miniature tape recorder of the invention is brought into the rewind or "R" position shown in FIG. 8. By the displacement of the slider 23, the stud 42 is pushed out of the region of the intermediate arm 58 of the slider 23, so that the end of the leaf spring 43 presses against the shaft 49 of the first drive wheel 18, which is thus moved against the driveshaft stub 17. Approximately at the same time, the circuit-closing contact pin 66 comes into contact with the grounded slider 23, whereby the batteries 37 are connected with the drive motor 40 and with the transistorized amplifier 68. The drive motor 40 is thus placed in rotation and via its driveshaft stub 17 drives the first drive wheel 18 which in its turn places the second drive wheel 20 in rotation via the drive belt 19. By the displacement of the slider 23, the edge of the hole 56 furthermore comes into contact with the end of the hairpin spring 26, so that in the final region of the displacement of the slider 23, the drive-wheel mount 21 is also pushed towards the left. In this way the second drive wheel 20 is brought into contact with the transporting wheel 46, whereby the tape 27 which has been found on the take-up spool 36 is rewound onto the supply spool 29. After the entire length of tape 27 has been wound onto the supply spool 29, the miniature tape recorder of the invention is ready for recording or playback.

Figure 9:
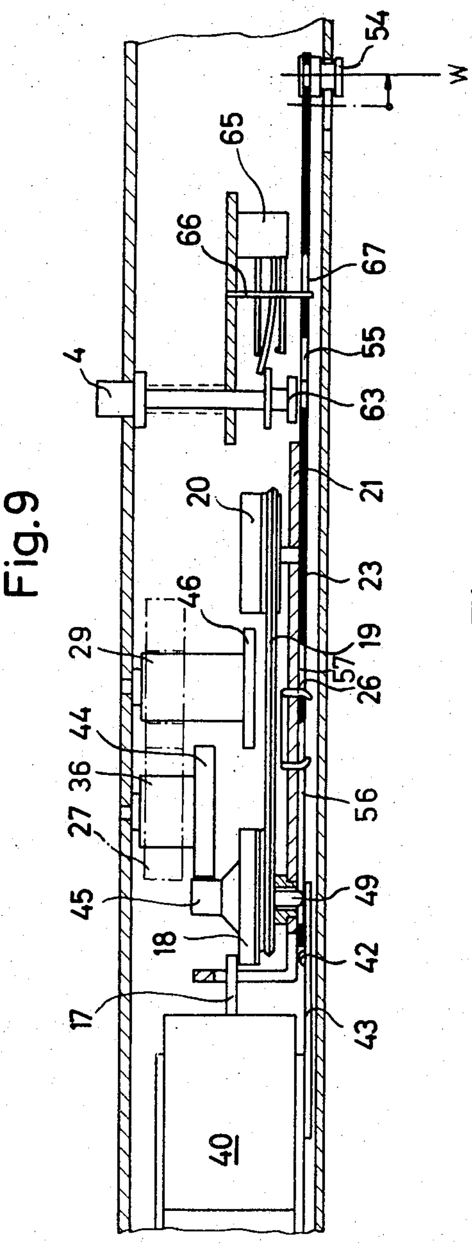

If the operating knob 54, instead of being moved to the left, is moved to the right, then the miniature tape recorder assumes the playback or "W" position shown in FIG. 9. In this position, the circuit-closing contact pin 66 comes into contact on the opposite side of the hole 67 with the grounded slider 23, so that the drive motor 40 and the amplifier 68 are fed by the batteries 37 in the same manner. By the displacement of the slider 23 to the right, the intermediate arm 58 furthermore passes out of the region of the stud 42, as a result of which the leaf spring 43 bends upward and by the pressure of its end against the shaft 47 presses the first drive wheel 18 against the driveshaft 17 of the drive motor 40. Finally, the one end of the hairpin spring 26 comes into contact with the edge of the hole 57, as a result of which the drive-wheel mount 21, including the two drive wheels 18, 20, is displaced towards the right. In this way the drive pinion 45 comes into contact with the vulcanized rubber covering of the tape transporting wheel 44, whereby the take-up spool 36 with the part of the tape 27 which has been wound thereon is placed in rotation and the tape 27 is pulled past the recording/playback head 32. The electrical signal given off by the recording/playback head 32 is amplified within the amplifier 65 and converted in the combined microphone-loudspeaker into an acoustic signal which is radiated out through the perforated plate 9.

Figure 10:
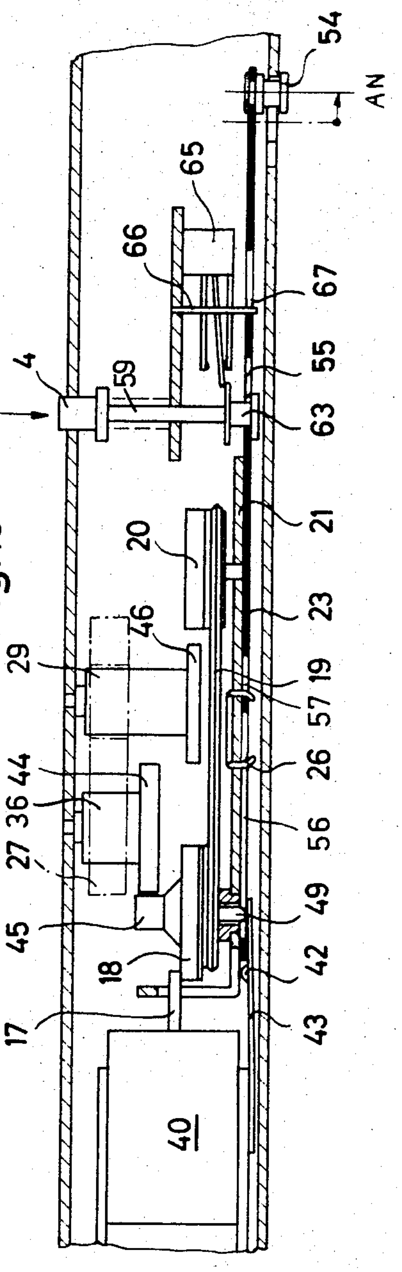

When the miniature tape recorder of the invention is to be placed in the "record" or "N" position shown in FIG. 10, it is then necessary, while the miniature tape recorder is in rest position — i.e., in the central position of the operating knob 54 — to press the recording button 4 down against the force of the compression spring 61, as a result of which the base 62 fastened to the pin 59 is pressed into the keyhole opening 55. In this way the set of changeover contacts 65 is actuated, whereby the electric circuit of the miniature tape recorder is switched from "playback" to "record". The operating knob 54 can now be moved only to the right in accordance with FIGS. 4 and 10, the annular groove 61 of the head 62 coming to lie within the narrowed portion of the keyhole opening 55. One thus obtains an automatic holding of the recording button 4 in this operating position. By the displacement of the slider 23 to the right, the intermediate arm 58 of the slider 23 passes — in the same manner as in the "playback" position — out of the vicinity of the stud 42, so that the first drive wheel 18 is pressed against the drive shaft 17 of the drive motor 40 in the manner which has already been described. Furthermore, the recorder is turned on by means of the circuit-closing contact pin 66 which is grounded by the slider 23. In addition, the drive-wheel mount 21 with the drive wheels 18, 20 is displaced towards the right, as a result of which the drive pinion 45 comes into contact with the tape transporting wheel 44.

Return into position of rest takes place in a very simple manner by actuation of the operating knob 54 and displacement thereof into its central or rest position "O". In this way the stud 42 passes into the sphere of action of the intermediate arm of the slider 23, as a result of which the first drive wheel 18 is moved away from the drive shaft 17. Furthermore the drive-wheel mount 21 together with the hairpin spring 26 is again imparted freedom with respect to the slider 23, so that the drive pinion 45 is lifted off from the tape transporting wheel 44. Furthermore, the base 62 which is provided with the annular groove 61 slips out of the narrowed end of the keyhole opening 55, so that the recording button 4 springs back under the action of the compression spring 61 and the set of changeover contacts 44 comes into its starting playback position. Finally, the contact of the circuit-closing contact pin 66 with the edge of the hole 67 is opened, so that both the amplifier 68 and the drive motor 40 are electrically separated from the batteries 37.

What is claimed is:

1. A miniature tape recorder for the electromagnetic recording, storing and playing back of information which comprises: an elongated bar-shaped hollow housing; and electric drive motor arranged in the hollow region of one end of said bar-shaped housing, an exchangeable tape cassette arranged in the central hollow region of said bar-shaped housing; a combined microphone-loudspeaker arranged in the hollow region of the other end of said bar-shaped housing; a combined recording and playback head; an eraser head; an electronic amplifier; switch means, said recording and playback head and said eraser head being arranged side by side within said housing between said tape cassette and said microphone-loudspeaker and oriented to contact said tape in said cassette driven by said motor, said motor, cassette and head being thus arranged in the order stated along the length of said housing, said exchangeable tape cassette including first and second spools, the axis of said spools being arranged side by side in a plane including the longitudinal axis of said bar shaped housing; said magnetic tape being wound on said spools; a first tape transporting wheel engaging said first spool; and said housing further including a second tape transporting wheel engaging said second spool, said first tape transporting wheel being located closer than said second wheel to said drive motor, a drive wheel mount displaceable from a rest position in the longitudinal direction of said bar-shaped housing; first and second drive wheels rotatably arranged on said mount; a drive belt connecting said drive wheels; a stub drive shaft extending from said drive motor, said first drive wheel having a bearing surface engageable with said drive shaft and having a drive pinion extending through an opening in the wall of said tape cassette, said drive pinion being engageable with said first tape transporting wheel upon displacement of said mount in one direction from said rest position; and said second drive wheel having a bearing surface engageable with said second tape transporting wheel upon displacement of said mount in the opposite direction from said rest position.

2. The miniature tape recorder according to claim 1 wherein the drive motor has a rotor axis extending longitudinally of said housing and wherein the recording and playback heas as well as the combined microphone-loudspeaker are arranged with their axes substantially along the extension of the rotor axis of the drive motor.

3. The miniature tape recorder according to claim 1 which further comprises: a control slider mounted within said bar-shaped housing and moveable in the longitudinal direction thereof from a rest position to one of several outer positions; a spring interconnecting said slider and said drive wheel mount for urging said mount for common movement with said slider.

4. A miniature tape recorder according to claim 3 wherein said first drive wheel is displaceable in the direction of its axis, and said recorder further comprises a leaf spring; a stud on said leaf spring; said leaf spring being mounted to engage and to resiliently bias said drive wheel in an axial direction and in facing position with said drive shaft, and and arm on said control slider, engageable with said stud in the rest position of said control slider to urge said spring away from said drive wheel and interrupt the resilient bias between said drive shaft and said drive wheel.

5. The miniature tape recorder according to claim 3 further comprising a displaceable and spring loaded recording button, moveable in said housing in a direction crossways of the longitudinal axis of said housing, said button having an enlarged base and an annular groove adjacent said base; a set of changeover switch contacts for setting said recorder for playback or record, said changeover contacts arranged to be switched by displacement of said button against its spring loading from a playback position to a record position, said control slider being formed with a keyhole bore having an enlarged end capable of accommodating the base of said control button, said enlarged end being aligned with said button in the rest position of said slider, said keyhole bore having a smaller end for accommodating said groove when said slider is displaced from its rest position, said groove being located away from said slider in the undisplaced position of said button and alignable with said slider when said button is moved against its spring loading whereby after the button has been displaced against its spring loading firstly the groove of said button contacting said keyhole bore of said control slider and the latter can be displaced from its rest position only in one of the two possible outer positions, and secondly the button is locked by said keyhole bore in the displaced position and, thirdly the set of changeover contacts is set by said button from playback to record position.

6. The miniature tape recorder according to claim 5 wherein said housing has a shuttle mounted therein for supporting said slider and said drive wheel mount, said shuttle being of semi-circular cross section and being provided on its outer side with longitudinal grooves for the passage of electrical wires.

* * * * *